No. 754,278. Patented March 8, 1904.

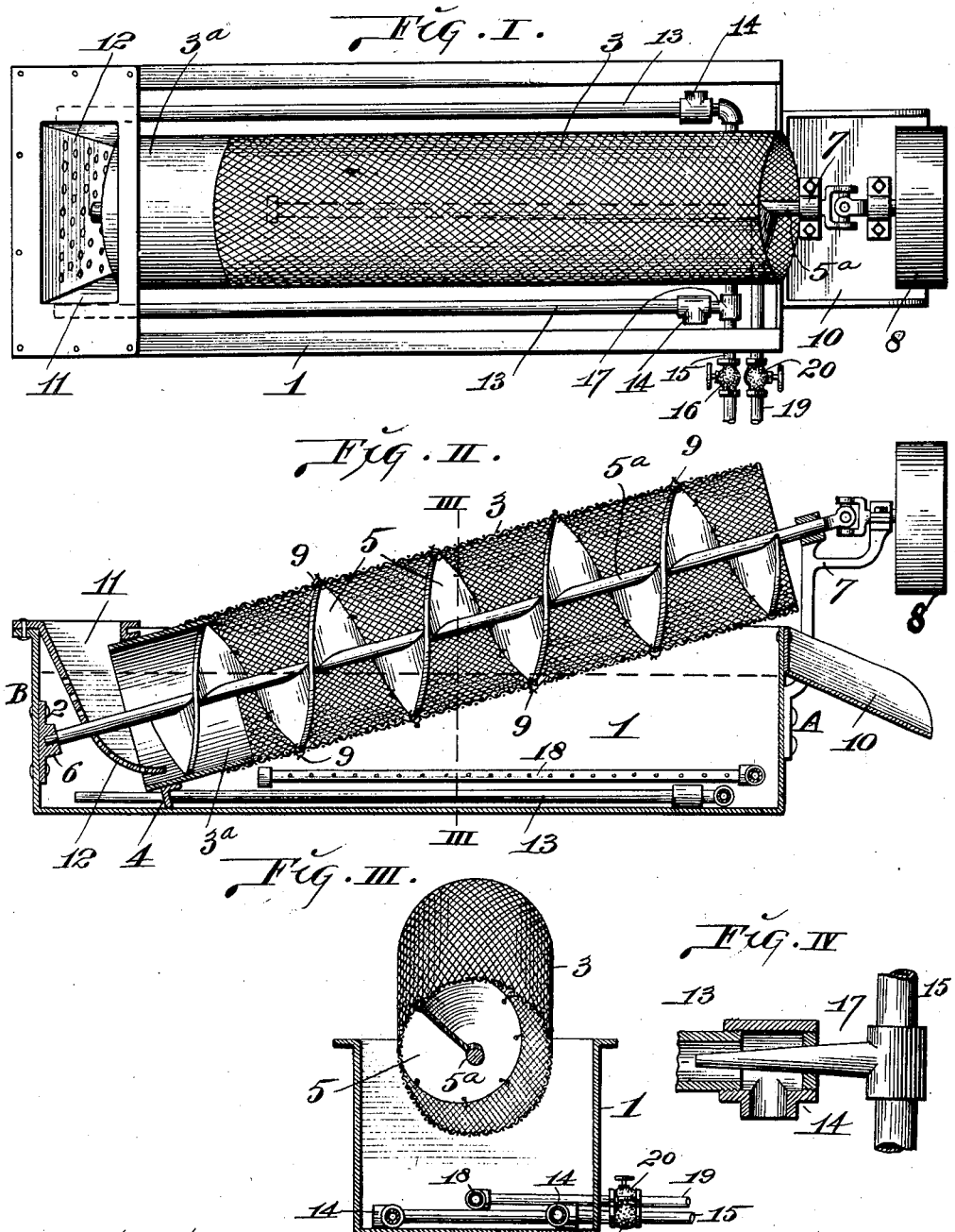

UNITED STATES PATENT OFFICE.

CHARLES BETZ AND PHILLIP SEIBEL, OF ST. LOUIS, MISSOURI.

DOUGH-COOKING MACHINE.

SPECIFICATION forming part of Letters Patent No. 754,278, dated March 8, 1904.

Application filed December 21, 1903. Serial No. 186,047. (No model.)

*To all whom it may concern:*

Be it known that we, CHARLES BETZ and PHILLIP SEIBEL, citizens of the United States, residing in the city of St. Louis, in the State of Missouri, have invented certain new and useful Improvements in Dough-Cooking Machines, of which the following is a full, clear, and exact description, reference being had to the accompanying drawings, forming part of this specification.

Our invention relates to an improved machine more particularly intended for cooking dough in making pretzels, wherein the common practice is to cook the dough in a hot-water bath.

Our invention consists in features of novelty hereinafter fully described, and pointed out in the claims.

Figure I is a top or plan view of our improved machine. Fig. II is a vertical longitudinal section. Fig. III is a vertical transverse section taken on line III III, Fig. II. Fig. IV is a section of one of the inlet-nipples of the water-circulating pipes and the injector entering thereinto.

Referring to the drawings, 1 represents a water-tank, at one end of which is a compartment 2.

3 represents a cylinder located in the tank in an inclined position. Its lower end fits loosely within a partition 4, which separates the main portion of the tank 1 from the compartment 2. The main portion of the cylinder 3 is made of perforated metal or wire-gauze, but the lower end 3ª of the cylinder is made solid or imperforate to serve as a bearing member in the partition 4. Within the cylinder is a conveyer-screw 5, the lower end of the shaft 5ª of which is stepped into a bearing 6, secured to the end of the water-tank. The upper end of the shaft is journaled in a bracket 7 and has connected to it a driving-pulley 8. The conveyer-screw is connected to the cylinder 3, as shown at 9, so that the two turn together.
At the delivery end A of the machine is a discharge-chute 10, and at the receiving end B there is a feed-opening 11, beneath which is a perforated curved feed-plate 12, positioned in the tank-compartment 2 and the lower end of which terminates within the open end of the part 3ª of the cylinder 3.

13 represents two water-circulating pipes located in the tank 1 and each having an open forward end extending into the tank-compartment 2.

14 represents inlet-nipples secured to the rear ends of the pipes 13 and open to communication with the interior of the tank 1 in order that the water in said tank may flow into the pipes 13 to be circulated into the compartment 2.

15 is a steam-pipe leading to both of the circulating-pipes 13 and provided with a controlling-valve 16. Fitted to the steam-pipe 15 at the location of the inlet-nipples 14 are injector-jets 17 (see Figs. I and IV) that enter into the inlet-nipple 14 and through the medium of which when steam is injected therethrough the water in the tank 10 is drawn into said inlet-nipples and forced through the circulating-pipes to be discharged into the tank-compartment 2.

18 is a perforated heating-pipe that extends longitudinally of the tank 1 and is connected to a steam-pipe 19, provided with a valve 20. The heating-pipe 18 serves as a heat-conducting member for the water in the tank 1, due to steam being conveyed thereinto and discharged through its perforations into such water.

The operation is as follows: The dough being fed through the opening 11 falls into the hot water in the tank-compartment 2. The perforated feed-plate 12 insures the entrance of the dough into the lower receiving end of the cylinder 3, and by reason of making the cylinder with an imperforate lower end 3ª the water passes through this end of the cylinder, thus causing the dough to float toward the delivery end of the machine, and when it has passed forward a distance which brings it to the point where the cylinder leaves the water it will be carried forward by the conveyer alone. Circulation of water is secured into the tank-compartment 2 from the main portion of the tank through the medium of the circulating-pipes 13 and the injectors applied thereto, and the water in said compartment is thereby maintained at a greater level than the water in the main portion of the tank, so that it will constantly pass from said compartment through the perforated feed-plate 12 and enter the lower end of the cylinder 3 to float the dough fed thereinto upwardly through the cylinder during the first portion of its travel therein instead of the conveyance of the dough being accomplished by the conveyer-screw 5 during the initial passage of the dough after it enters into said cylinder. This is important for the reason that when the dough is first wet after being fed into the cooking-machine it becomes paste-like and any mechanical means used to convey it while in such paste-like condition would cause the dough to become an impact mass. As soon as the dough has become cooked, during the process of which it is floated, its paste-like consistency is eliminated, and the conveyer-screw 3 may then act to carry the dough to the discharge end of the machine without detriment thereto. By perforating the plate 12 it does not interfere with the circulation of the water to any material extent.

By connecting the cylinder to the conveyer so that they will turn together the dough is not cut up or broken, as there would be great danger of doing if the cylinder was stationary and the screw turned within the cylinder.

The machine is simple and inexpensive, and there is nothing about it to get out of order and makes a very effective and desirable dough-cooker.

We claim as our invention—

1. In a dough-cooking machine, the combination of a water-tank, a cylinder located within the tank, and a screw located within the cylinder; said cylinder being connected to said screw so as to turn therewith, and having its lower end beneath the water-line in the tank, substantially as set forth.

2. In a dough-cooking machine, the combination of a water-tank, a cylinder located in the tank in an inclined position, and a screw located within the cylinder; said cylinder being connected to said screw so as to turn therewith, substantially as set forth.

3. In a dough-cooking machine, the combination of a water-tank, a cylinder located in the tank in an inclined position, and a screw located in the cylinder; said cylinder being perforated throughout the greater portion of its length and imperforate at its receiving end, which is open and located beneath the water-line, substantially as and for the purpose set forth.

4. In a dough-cooking machine, the combination of a water-tank, a cylinder located in the tank, and a screw located in the cylinder; said cylinder being perforated throughout the greater portion of its length and imperforate at its feed end, which is open and located beneath the water-line, substantially as set forth.

5. In a dough-cooking machine, the combination of a water-tank, a cylinder located within the tank in an inclined position, a screw located within the cylinder, and a perforated feed-plate located at the feed end of the cylinder; said cylinder being perforated throughout the greater portion of its length and imperforate at its feed end, substantially as set forth.

6. In a dough-cooking machine, the combination of a water-tank, means for heating the water within the tank, a cylinder located in the tank in an inclined position, a screw located within the cylinder, and a perforated curved plate located at the feed end of the cylinder; said cylinder being perforated throughout the main portion of its length and imperforate at its feed end, substantially as set forth.

7. In a dough-cooking machine, the combination of a water-tank having a compartment at one end separated from the main portion of the tank, a cylinder located in the tank, a conveyer located in said cylinder, and means for circulating the water from the main portion of said tank to said compartment; said compartment being arranged in communication with the receiving end of said cylinder, substantially as set forth.

8. In a dough-cooking machine, the combination of a water-tank, a partition dividing said tank into a main portion and a separated compartment, a cylinder located in said tank in an inclined position and having its lower end arranged in communication with said tank-compartment, a conveyer in said cylinder, and water-circulating pipes having communication with the main portion of said tank and said separated compartment, substantially as set forth.

9. In a dough-cooking machine, the combination of a water-tank, a partition dividing said tank into a main portion and a separated compartment, a cylinder located in said tank in an inclined position and having its lower end extending to said tank-compartment, a conveyer in said cylinder, water-circulating pipes located in said tank and having open ends extending into said tank-compartment, inlet-nipples connected to said circulating-pipes within the main portion of said tank, a steam-pipe and jets extending from said steam-pipe into said inlet-nipples, substantially as set forth.

CHAS. BETZ.
PHILLIP SEIBEL.

In presence of—
E. S. KNIGHT,
M. P. SMITH.